Oct. 6, 1959  J. J. SCIGLIANO  2,907,687
CLEANING SPINNERETTES
Filed Feb. 21, 1958
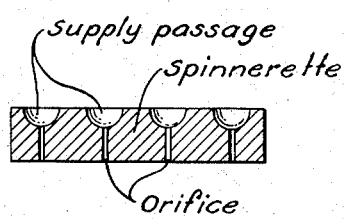
Fig. "A"
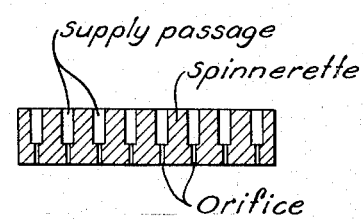
Fig. "B"
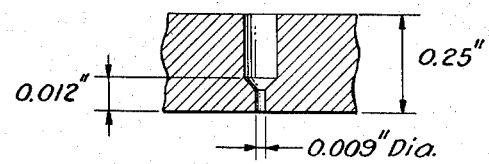
Fig. "X"
INVENTOR.
Joseph J. Scigliano
BY Griswold & Burdick
Jerome Rudy
ATTORNEYS

United States Patent Office 2,907,687
Patented Oct. 6, 1959

2,907,687

CLEANING SPINNERETTES

Joseph J. Scigliano, Midland, Mich., assignor to The Dow Chemical Company, Midland, Mich., a corporation of Delaware Application February 21, 1958, Serial No. 716,582

4 Claims. (Cl. 134—5)

The chief aim and concern of the present invention is to provide a new and improved method or procedure of cleaning spinnerettes that are plugged, contaminated or fouled with deposits or residues of polymeric or thermoplastic resinous compositions which have been melt spun through the spinnerette into filamentary and the like extruded products.

The usual procedure for cleaning contaminated spinnerettes, or multiple-orifice extrusion dies, is to burn off or carbonize the contaminating plastic or to solubilize it, generally with assistance of heat and pressure, by means of a suitable solvent for the plastic being removed. In addition to being generally time-consuming, such techniques frequently may not achieve entirely satisfactory results. This is particularly the case when cleaning the spinnerettes of the type that have relatively fine individual orifices or jet-holes that are individually supplied through separate, deep, generally cylindrical passageways which are bored in the back side of the spinnerette to provide communication for the melt being extruded from the supply source therefor to the jet hole. Such spinnerettes, which are of relatively recent development, are schematically illustrated in Figure B of the accompanying drawing, showing the spinnerette in cross-sectional elevation. The newly developed spinnerettes shown in Figure B are generally much more difficult to clean than the older variety, similarly depicted in Figure A of the drawing, which may be characterized in having round bottomed or hemisphered supply channels leading to the jet holes.

According to the present invention, metal spinnerettes and the like extrusion devices for the melt spinning of thermoplastic polymers and resinous plastic compositions into filamentary and the like articles (including monofilament and film dies) may be effectively and efficiently cleaned in relatively short order following a procedure or by a method which comprises immersing the contaminated spinnerette into a hot bath of a normally liquid, water-soluble ethylene glycol or propylene glycol or glycerol or a polyglycol derived from ethylene oxide or propylene oxide (or substituted polyglycol) or mixtures thereof (hereinafter referred to as glycols or polyglycols) which is incompatible with the polymer of plastic composition being removed until the polymer softens or fuses, said bath being maintained at a temperature above at least the softening (and more advantageously above the fusing) point of the thermoplastic composition being removed; removing the so-treated spinnerette from the hot glycol bath; then quenching the thereby heated spinnerette while it is still hot in an aqueous bath, preferably cool water, whereupon the plastic is disengaged and forced away from the spinnerette which is thereby placed in a suitably clean condition by the consequent freeing or ridding from its surfaces of the plastic attached thereto.

Advantageously, when such plastics as saran polymers or polyethylene or polypropylene and the like polyolefins are being removed, the hot glycol or polyglycol bath is maintained at a temperature of from 120 to 230° C., preferably from 150 to 200° C., for immersion of the contaminated spinnerette therein. It is usually desirable to maintain the glycol or polyglycol bath as near to its boiling point as possible. In most cases, the operation can be performed under atmospheric pressure although, if desired, the hot glycol or polyglycol bath may be kept in a pressure system to elevate its boiling point. Generally, the treatment of the spinnerette in the glycol bath can be accomplished within periods of time between about one-quarter and two, preferably not more than one-half hours. The aqueous bath for quenching the spinnerette after its treatment in the glycol is advantageously maintained at a temperature less than about 90° C., preferably in a cool condition lower than about 50° C. If desired or necessary, the treatment of the present invention can be accomplished in a series of steps in which the contaminated spinnerette is heated in the glycol bath, then quenched in the aqueous (preferably water) bath and the cycle repeated until satisfactory cleaning of the extrusion device has been accomplished. Such a multiple heating and quenching operation is frequently of great expedience to facilitate the cleaning of spinnerettes contaminated or fouled with considerable quantities of polymer residue. The initial step or steps are generally especially effective for removing the major proportion of the contaminating deposit permitting the subsequent heating and quenching operation to efficiently dispose of any plugging in the jet holes.

Practice of the present invention is advantageous for the cleaning of spinnerettes used for the melt extrusion of any polymeric or plastic material which is incompatible with the glycol compound utilized in the glycol treating bath. Thus, the glycol cannot be effective to dissolve, plasticize or materially swell the resinous material being removed from the contaminated spinnerette. Advantageously, as has been indicated, the invention is practiced to clean spinnerettes or other extrusion devices that have been used for the melt extrusion of the various saran polymers, i.e., the normally crystalline polymers and copolymers of vinylidene chloride that contain at least about 60 and preferably at least about 80 percent by weight of vinylidene chloride polymerized in the copolymer molecule with such other comonomeric constituents as vinyl chloride, acrylonitrile, etc.; and the non-aromatic hydrocarbon polyolefins such as polyethylene and polypropylene, including the linear macromolecular varieties of such materials. The invention may also be practiced with advantage to clean spinnerettes from polyesters, including the condensation polymers of the various glycols such as ethylene glycol with terephthalic acid and the like; superpolyamides, including the polymer products of hexamethylene diamine and adipic acid known as nylon "66" and e-caprolactam, known as nylon "6"; and so forth.

Among the normally liquid, water-soluble glycols and polyglycols that may be employed in the practice of the present invention are dipropylene glycol, ethylene glycol, di-ethylene glycol, propylene glycol and the like and related reaction products of ethylene oxide or propylene oxide or their mixtures with active hydrogen materials, as well as glycerol. These glycols and polyglycols, as is the case with glycol, are well known to those who are skilled in the art. They may properly be and often are generically characterized as being "polyols." Such glycol and polyglycol compounds, according to established understanding, contain either oxyethylene, oxypropylene or mixed oxyethylene-oxypropylene groups, as is typically represented by the oxyethylene unit —$C_2H_4O$— that occurs in ethylene glycol and the various polyethylene glycol products. Advantageously, dipropylene glycol is employed, especially for cleaning spinnerettes contaminated with saran or polyethylene plastic. As mentioned, the non-compatible polyol or polyol mixture that is employed should be selected so as to have a higher boiling point under the contemplated operating pressure, preferably atmospheric, than the softening and preferably the fusing point of the plastic composition being removed.

In order to further illustrate the invention, a multiple orifice spinnerette having 283 individual jet holes, each of the dimensions indicated in Figure "X" of the accompanying drawing, wherein the orifices were spaced on about 0.063 inch centers in a plurality of generally concentrically disposed rings in the spinnerette, had been employed for the melt extrusion of a saran into filamentary articles consisting of a copolymer of about 85 percent vinylidene chloride with 15 percent vinyl chloride. After the spinnerette had become contaminated and plugged as a result of the spinning operation, it was removed from the extrusion assembly for cleaning. The cleaning was accomplished by placing the spinnerette (attached to a wire holder) in complete immersion in a bath of dipropylene glycol at about 230° C. The spinnerette was permitted to remain in the bath for about 15 minutes, at which point the contaminated saran plastic was noted to soften. The spinnerette was removed from the glycol bath and immediately quenched (while still hot) in water at a temperature of about 25–30° C. The immersion in the cold water caused the carbonized contaminating plugs of saran polymer to literally pop out of the jet holes due to the generation of steam pressure during the quenching. The spinnerette was then dried under a stream of pressurized air and found to be in suitable condition for reemployment in the spinning operation. No trace of polymer residue was discernible on the cleaned spinnerette by visual inspection thereof.

In a duplication of the foregoing operation to clean another similarly fouled spinnerette, a repeat of the same cycle on the once-cleaned spinnerette placed it in such excellent condition that microscopic examination failed to reveal even traces of polymer contaminated on its surface.

The scope and purview of the present invention, which is merely illustrated in and not restricted or limited by the foregoing description and specification, is delineated in and to be construed from the hereto-appended claims.

What is claimed is:

1. Procedure for cleaning spinnerettes and the like extrusion devices to rid them of contaminating deposits of a thermoplastic melt spinnable plastic compound that is incompatible with normally liquid water-soluble glycols and polyglycols which thermoplastic compound has been melt spun through said spinnerette, which procedure comprises immersing the contaminated spinnerette in a polyol bath maintained at a temperature in excess of at least the softening temperature of said thermoplastic compound of a normally liquid, water-soluble polyol selected from the group consisting of glycerol, ethylene glycol, propylene glycol, polyglycol derivatives of ethylene oxide containing oxyethylene groups, polyglycol derivatives of propylene oxide containing oxypropylene groups, polyglycol derivatives of ethylene oxide and propylene oxide containing mixed oxyethylene-oxypropylene groups, and mixtures thereof until the plastic compound on said spinnerette at least begins to soften; removing the heated spinnerette from said hot bath; then quenching the so-treated spinnerette while hot in an aqueous bath.

2. The method of claim 1, wherein said water bath is maintained at a temperature not in excess of about 50° C.

3. The method of claim 1, wherein said contaminating plastic compound is selected from the group of thermoplastic polymers consisting of normally crystalline copolymers of vinylidene chloride and non-aromatic hydrocarbon polyolefins and said polyol bath is maintained at a temperature between about 120 and 230° C.

4. The method of claim 3, wherein said bath temperature is between about 150 and 200° C.

References Cited in the file of this patent

UNITED STATES PATENTS

| | | |
|---|---|---|
| 1,714,173 | Kessler | May 21, 1929 |
| 2,492,451 | Wicker | Dec. 27, 1949 |
| 2,610,166 | Parry | Sept. 9, 1952 |

UNITED STATES PATENT OFFICE
CERTIFICATE OF CORRECTION

Patent No. 2,907,687                             October 6, 1959

Joseph J. Scigliano

It is hereby certified that error appears in the printed specification of the above numbered patent requiring correction and that the said Letters Patent should read as corrected below.

Column 2, line 60, for "glycol" read -- glycerol --.

Signed and sealed this 21st day of June 1960.

(SEAL)
Attest:

KARL H. AXLINE
Attesting Officer

ROBERT C. WATSON
Commissioner of Patents